United States Patent [19]
Morris et al.

[11] Patent Number: 5,603,966
[45] Date of Patent: Feb. 18, 1997

[54] BLOW PIN ADJUSTING ADAPTER

[75] Inventors: Terry L. Morris; Bryan K. Street, both of Jackson, Mich.

[73] Assignee: Allied Tool, Inc., Michigan Center, Mich.

[21] Appl. No.: 564,733

[22] Filed: Nov. 29, 1995

[51] Int. Cl.⁶ ............................................. B29C 49/58
[52] U.S. Cl. ................................... 425/168; 425/535
[58] Field of Search ............................ 425/168, 535, 425/536

[56] References Cited

U.S. PATENT DOCUMENTS

| | | | |
|---|---|---|---|
| 3,340,569 | 9/1967 | Hagen | 425/535 |
| 3,907,475 | 9/1975 | Bowers | 425/535 |
| 4,187,070 | 2/1980 | Martin, Jr. | 425/535 |
| 4,954,071 | 9/1990 | Austin | 425/535 |
| 5,385,466 | 1/1995 | Konefal | 425/535 |

*Primary Examiner*—Robert Davis
*Attorney, Agent, or Firm*—Duncan F. Beaman

[57] ABSTRACT

An adapter for blow molding machines mounted upon the piston of an expansible chamber motor for advancing and retracting the blow pin, the blow pin being mounted upon the adapter, and the adapter includes adjusting means for laterally adjusting the blow pin relative to the expansible chamber piston so as to accurately position the blow pin end within the mold to permit the blow pin end to be accurately located with respect to the associated shear steels and air seal.

9 Claims, 1 Drawing Sheet

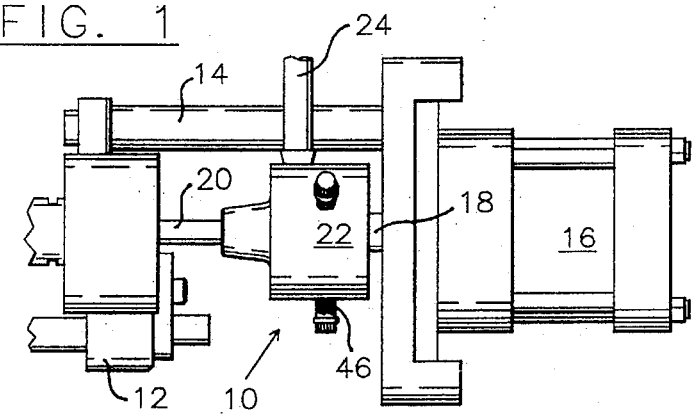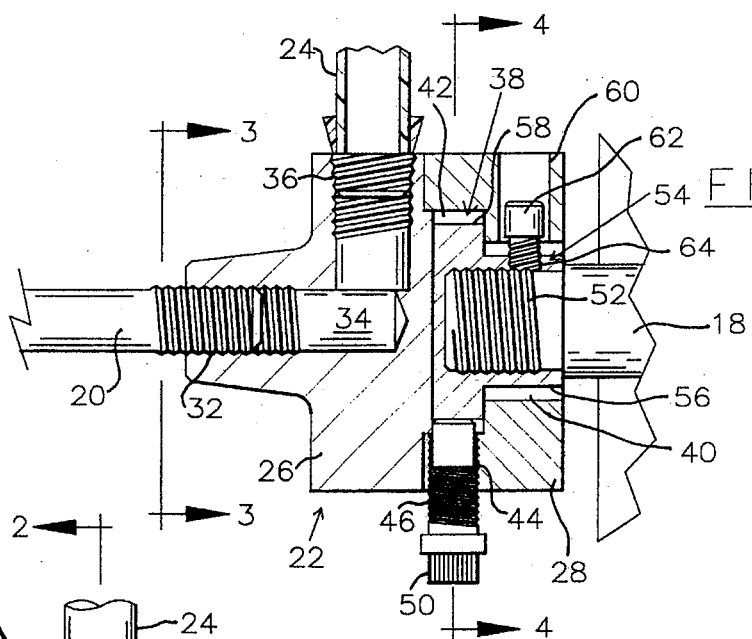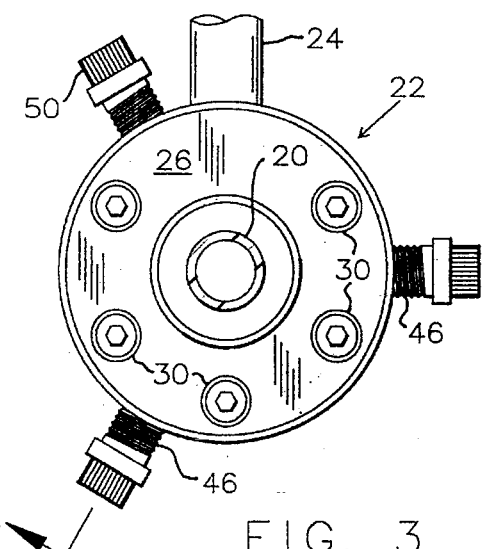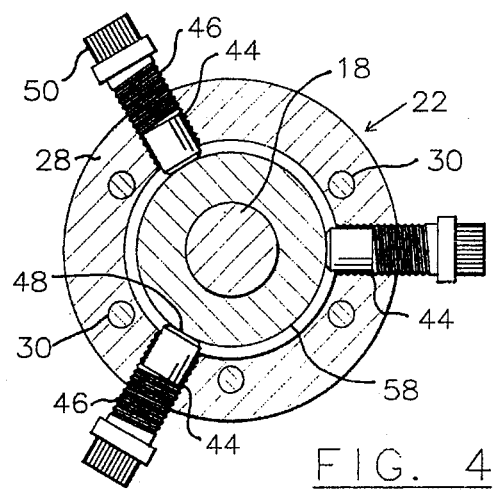

5,603,966

BLOW PIN ADJUSTING ADAPTER

BACKGROUND OF THE INVENTION

1. Field of the Invention

The invention pertains to blow molding machines, and in particular, to an adapter interposed between an expansible chamber motor and a blow pin permitting relative radial adjustment of the blow pin and expansible chamber motor piston to accurately position the blow pin with respect to shear steels and air seal adjacent the machine mold.

2. Description of the Related Art

The blow pin of blow molding machines is supported by and advanced and retracted with respect to its associated mold by an expansible chamber motor. The inner or lower end of the blow pin is located within the mold in which the blown product is shaped, and the inner end cooperates with the air seals and also functions as an anvil which forces the plastic against the shear steels to shear the neck of the blown article, such as a synthetic plastic beverage bottle, when the blow pin is raised. The shear steels are mounted upon top blocks and in order for the shear steels to properly correlate to the blow pin inner end, the blow pin must be accurately located relative to the top blocks and shear steels.

Due to misalignment in the blow molding machine head, inaccuracies in the blow pin configuration, or for other reasons, it is difficult to maintain the accurate dimensional tolerances necessary between the location of the blow pin inner end and the shear steels to achieve optimum shearing.

Previously, a quick accurate system for positioning the blow pin and the adjacent shear steels has not been available wherein adjustment could be quickly accomplished by a machinist of ordinary skill.

OBJECTS OF THE INVENTION

It is an object of the invention to provide an adapter for a blow molding machine interposed between the blow pin actuating expansible chamber motor and the blow pin whereby lateral adjustment of the blow pin is quickly and accurately achieved by an operator of ordinary skills.

Another object of the invention is to provide apparatus for adjusting the lateral position of a blow pin located in a blow molding machine whereby the blow pin may be readily adjusted relative to the adjacent shear steels throughout a full 360° range whereby the concentricity of the blow pin and the shear steels may be accurately maintained regardless of inaccuracies which may exist in the blow pin support or other structure.

Yet another object of the invention is to provide an adapter for blow molding apparatus interposed between the blow pin and its extension and retraction expansible chamber motor which may be retrofitted to existing equipment, and wherein accurate lateral adjustment of the blow pin may be accurately achieved in minimal time by a machinist of ordinary skill.

SUMMARY OF THE INVENTION

Conventional blow molding machines include a plurality of stations wherein each station includes a head, a blow pin of an elongated configuration capable of being extended into the mold in which the product is formed, and retracted from or extended into the mold during shearing and product release, and the axial displacement of the blow pin is usually accomplished by means of an expansible chamber motor having an axially positionable piston which is connected to the blow pin outer or upper end.

The improvement achieved by the invention derives from the use of an adapter interposed between the piston and the blow pin outer or upper end whereby relative radial or lateral adjustment of the blow pin to the piston is possible.

The adapter includes a collar threaded upon the expansible chamber piston. The adapter also includes a housing having a threaded blow pin receiving port in which the blow pin outer end is located, and this port communicates with a cavity defined in the housing which also communicates with the supply for the compressed air blown through the blow pin into the mold in which the product is formed.

The housing includes an axially extending extension circumscribing the collar mounted on the piston. Three radially disposed adjusting screws threaded into holes in the housing extension have inner ends engaging the collar. The housing chamber in which the collar is located is of a greater inner diameter than the outer diameter of the collar whereby adjustment of the screws permits the axis of the housing to be laterally adjusted relative to the axis of the collar and piston. Accordingly, by adjusting the three screws mounted in the housing, radial movement of the blow pin relative to the piston axis is achieved resulting in the desired lateral movement at the blow pin relative to the shear steels.

The three adjusting screws each include an actuating knob at their outer accessible end and the 120° circumferential spacing between these pins permits the housing to be adjusted in any 360° direction relative to the piston mounted collar. The adjustment occurring at the blow pin inner or lower end due to the lateral positioning of the blow pin can be accurately determined, and upon tightening of the adjusting screws, the lateral position of the blow pin can be fixed as desired.

The adapter structure in accord with the invention can be readily retrofitted to existing blow molding machine pistons and blow pins, and the adapter easily and quickly permits fine adjustments to be made with respect to the radial position of the blow pin to its associated shear steels and air seal.

BRIEF DESCRIPTION OF THE DRAWINGS

The aforementioned objects and advantages of the invention will be appreciated from the following description and accompanying drawings wherein:

FIG. 1 is a partial elevational view of a blow pin machine head, expansible chamber motor, and the blow pin outer end as associated with an adapter in accord with the invention, FIG. 2 is an enlarged detail elevational sectional view of the adapter as mounted upon an expansible chamber motor, and receiving a blow pin outer or upper end, FIG. 3 is an elevational sectional view of the adapter as taken along Section 3—3 of FIG. 2, and FIG. 4 is an elevational sectional view taken through the adapter adjustment screws along Section 4—4 of FIG. 2.

DESCRIPTION OF THE PREFERRED EMBODIMENT

With reference to FIG. 1, a typical head of a blow molding machine is shown at 10. Usually, blow molding machines will consist of a plurality of heads located in a row wherein a plurality of finished products may be simultaneously handled. The heads will be oriented in a vertical manner, and for purpose of illustration only, the head 10 is shown in FIG. 1 in a horizontal orientation.

Typically, each head 10 includes a manifold 12 into which the thermoplastic material to be shaped is introduced. The head also includes a support bar mechanism 14 upon which an expansible chamber motor 16 is mounted which may be either fluid or air operated. The motor 16 includes an extendible and retractable piston 18.

The piston 18 is coaxial with the elongated tubular blow pin 20 whose lower or inner end, not shown, is located at the mold which shapes the finished product. The elongated blow pin 20 includes an upper or outer end mounted within an adapter 22 interposed between the piston 18 and the blow pin 20. A flexible air hose 24 in communication with the interior of the adapter 22 introduces air into the adapter which flows through the blow pin into the mold of the machine to force the hot blown material against the mold configuration, not shown.

The adapter 22 is formed of two pieces, left portion 26, FIG. 2, and right portion 28. These portions are held together by a plurality of bolts 30, FIGS. 3 and 4. The threaded blow pin port 32 is axially defined in the portion 26 for receiving the threaded outer end of the blow pin 20, and the blow pin port communicates with cavity 34.

The air supply hose 24 is threaded into the compressed air supply port 36 defined in adapter portion 26 which also communicates with cavity 34. Accordingly, compressed air introduced into the cavity 34 will flow through the blow pin 20 into the mold cavity wherein molding is occurring.

A chamber 38 is defined in the adapter 22 within the portion 28 and includes a smaller diameter chamber 40 and a larger diameter chamber 42. The chamber 38 is coaxially related to the axis of the adapter 22, and three threaded holes 44 are defined in the portion 28 radially disposed to the adapter axis at 120° locations about the adapter.

An adjustment screw 46 is threadably located within each hole 44 and each screw includes an inner end 48 extending into the chamber 38 and an outer knob end 50 permitting the associated screw to be rotated and radially positioned within the adapter.

As appreciated from FIG. 2, the end of the piston 18 is threaded at 52 and a collar 54 having a threaded bore is threaded upon the piston end 52. The collar 54 is of a cylindrical configuration having a small diameter 56 located within chamber 40 and a large diameter 58 located within chamber 42. A slot 60 is defined within adapter portion 28, FIG. 2, and the slot 60 provides access to a threaded screw 62 threaded into a radial hole 64 defined in the collar portion 56 intersecting the collar threaded bore.

The adapter 22 of the invention can be retrofitted to existing blow molding machines, or may be sold with original new equipment. The adapter 22 is attached to the piston 18 by the threaded end 52 received within collar 54. Once assembled, relative rotation between the collar and piston end is prevented by tightening of the screw 62 through slot 60.

The blow pin outer end is threaded into the blow pin port 32, and the air supply hose 24 is threaded into the air supply port 36. In the aforedescribed manner, the adapter 22 connects the blow pin 20 to the piston 18 and the axial movement of the blow pin during each blow molding cycle will be achieved by the linear movement of the piston 18 as the close reception of collar portion 58 within chamber 42 axially interconnects the collar 54 and portions 26 and 28.

It is to be appreciated that in its normal orientation, the axis of the blow molding head 10 is vertical, rather than horizontal as shown in FIG. 2. The support for the blow pin 20 is provided by the adapter 22 and the lateral position of the blow pin 20 relative to the piston 18 is achieved by adjusting the screws 46. As the screws 46 are located at 120° intervals with respect to the circumference of the collar diameter 58, rotation of the screws permits the adapter portions 26 and 28 to be radially adjusted with respect to the collar 54 and collar diameter 58, and tightening of the screws 46 will firmly maintain the desired radial relationship between the adapter 22 and the collar 54.

In the aforedescribed manner, the lateral position of the blow pin 20 located within the mold may be adjusted. This adjustment of the blow pin accurately relates the blow pin to the associated air seal and shear steels. Accordingly, the adapter 22 permits the blow pin to be accurately positioned relative to the mold structure insuring accurate and sharp shearing of the edge of the blown bottle during the upward movement of the blow pin which forces the blown material against the shear steel. The ability to quickly adjust the radial position of the blow pin by the screws 46 renders a versatility to blow molding equipment not previously available, and permits the blow pin to be more accurately related to the mold structure than has previously been possible.

The ability of the adapter 22 to be readily retrofitted to existing equipment permits the advantages of the invention to be used with blow molding machines now in use, and it will be appreciated that various modifications to the inventive concepts may be apparent to those skilled in the art without departing from the spirit and scope of the invention.

I claim:

1. In a blow molding machine having an elongated tubular blow pin having an axis capable of lateral and axial adjustment including an outer end and an expansible chamber motor having a movable piston, the improvement comprising, an adapter interposed between and interconnecting the expansible chamber motor piston and the blow pin outer end, and radial adjustment means defined on said adapter whereby the blow pin outer end is radially adjustable with respect to the piston, comprising a collar fixed upon the expansible chamber motor piston, a housing mounted upon the blow pin outer end, a chamber defined in said housing having an axis and receiving said collar, and radially positionable actuators interposed between said housing and said collar radially positioning the adapter housing and blow pin outer end with respect to said collar.

2. In a blow molding machine as in claim 1, said radially positionable actuators comprising a plurality of threaded screws threaded into said housing each having an inner end engaging said collar and an accessible end permitting rotation of said screws.

3. In a blow molding machine as in claim 1, a blow pin receiving port defined in said housing coaxial with said housing chamber, the blow pin being received within said port, a cavity defined in said housing, said blow pin port being in communication with said cavity, and a compressed air supply inlet port defined in said housing in communication with said cavity.

4. An adapter for a blow molding machine having a blow pin having an outer end and an expansible chamber motor having a piston for connecting the blow pin outer end to the piston of the expansible chamber motor comprising, in combination, a housing having an axis and first and second sides, a chamber defined in said housing first side coaxial with said axis, a blow pin port defined in said housing second side coaxial with said axis for receiving the end of a blow pin, a collar within said chamber having an axis substantially parallel to said housing axis and radially displaceable within said chamber and axially fixed thereto, piston mounting means defined on said collar to permit said collar to be mounted upon an expansible chamber motor piston, a compressed air supply port defined in said housing in communication with said blow pin port, and radially displaceable adjustment means mounted on said housing engaging said collar whereby the axes of said housing and said collar may be laterally adjusted relative to each other.

5. In an adapter for a blow molding machine as in claim 4, said collar piston mounting means comprising a coaxial threaded bore defined in said collar.

6. In an adapter for a blow molding machine as in claim 4, said radially displaceable adjustment means comprising a plurality of radially extending circumferentially spaced screws defined in said housing, each having an inner end engaging said collar.

7. In an adapter for a blow molding machine as in claim 6, said screws having an exteriorly accessible outer end for rotating said screws.

8. In an adapter for a blow molding machine as in claim 7, a knob defined on said screws outer end to facilitate rotation thereof.

9. In an adapter for a blow molding machine as in claim 4, a cavity defined in said housing, said blow pin port and said compressed air supply port being in communication with said cavity.

* * * * *